United States Patent [19]

Pannell

[11] 4,273,495
[45] Jun. 16, 1981

[54] APPARATUS AND METHOD FOR LAYING COMPOST IN A MUSHROOM BED

[75] Inventor: Robert T. Pannell, Kennett Square, Pa.

[73] Assignee: Pannell Manufacturing Corporation, Avondale, Pa.

[21] Appl. No.: 59,580

[22] Filed: Jul. 23, 1979

[51] Int. Cl.³ .......................... A01G 1/04; B65B 1/30
[52] U.S. Cl. ...................................... 414/272; 47/1.1; 141/125; 414/301
[58] Field of Search ........................ 47/1 R, 1 A, 1.1; 141/1, 125, 280, 284, 324; 198/371; 414/269, 272, 293, 300, 786, 301

[56] References Cited

U.S. PATENT DOCUMENTS

| 859,595 | 7/1907 | Camp | 198/371 |
|---|---|---|---|
| 1,669,526 | 5/1928 | Lauhoff | 141/125 X |
| 3,936,975 | 2/1976 | de Winter | 47/1.1 |
| 4,153,084 | 5/1979 | Payne | 141/125 X |

Primary Examiner—Frederick R. Schmidt
Attorney, Agent, or Firm—Mortenson & Uebler

[57] ABSTRACT

Apparatus and a method for laying a uniformly thick and, hence, a uniformly dense bed of compost for growing mushrooms and the like are provided. In the shelf system compost is supplied via a conveyer belt from an external supply through the door of a conventional mushroom house to a transverse, variable speed, reversible distributor which distributes the compost uniformly across the shelf at one end thereof onto a moving belt or web, which belt moves along the floor of the shelf from the supply end of the shelf to the far end thereof. The compost which is distributed by the distributor at the supply end moves on the belt toward the far end on the belt, being passed under a rotating, bladed leveling member located in close proximity to the supply end. The blades are set at a height from the floor of the shelf corresponding to the desired thickness of the final compost bed. Any compost on the moving belt that is above the desired level is thrown back by the rotating blades as the loaded belt is passing under the leveler. Thus, the blades or the like level the compost to the desired bed thickness very uniformly across the entire width of the bed. This results in a bed of uniform thickness and density along its entire length and width.

4 Claims, 9 Drawing Figures

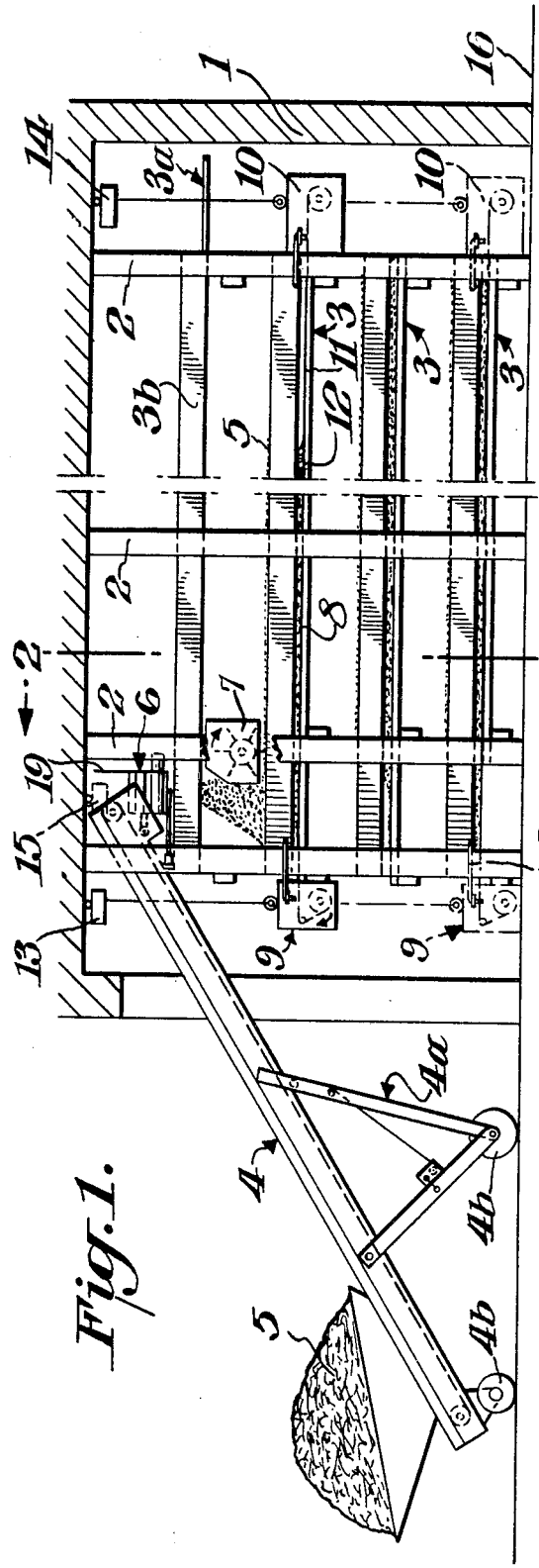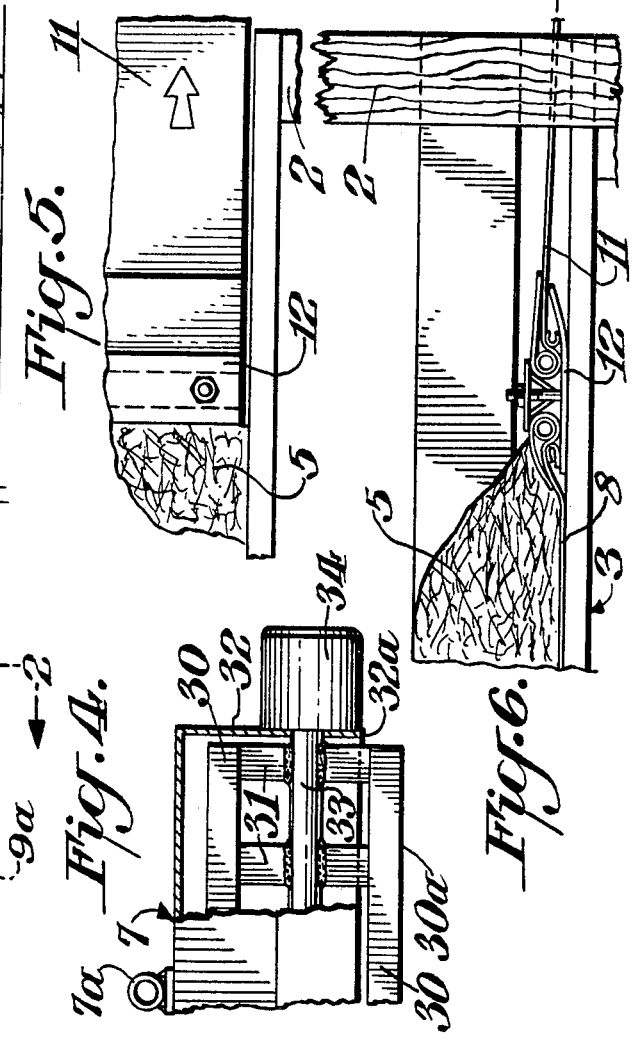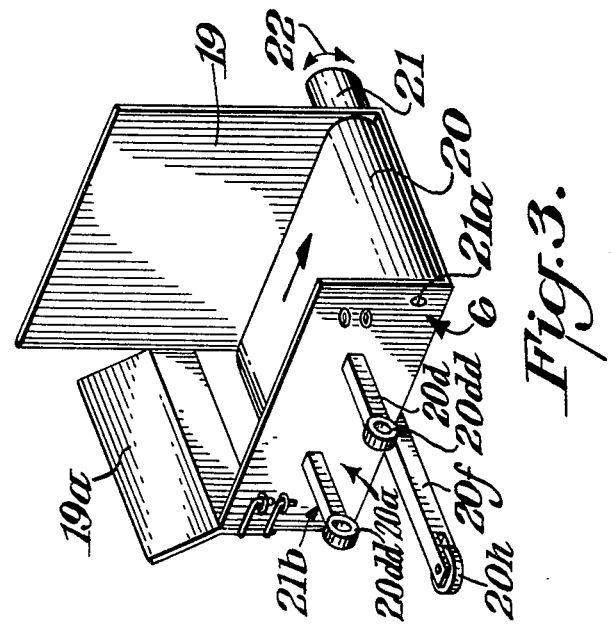

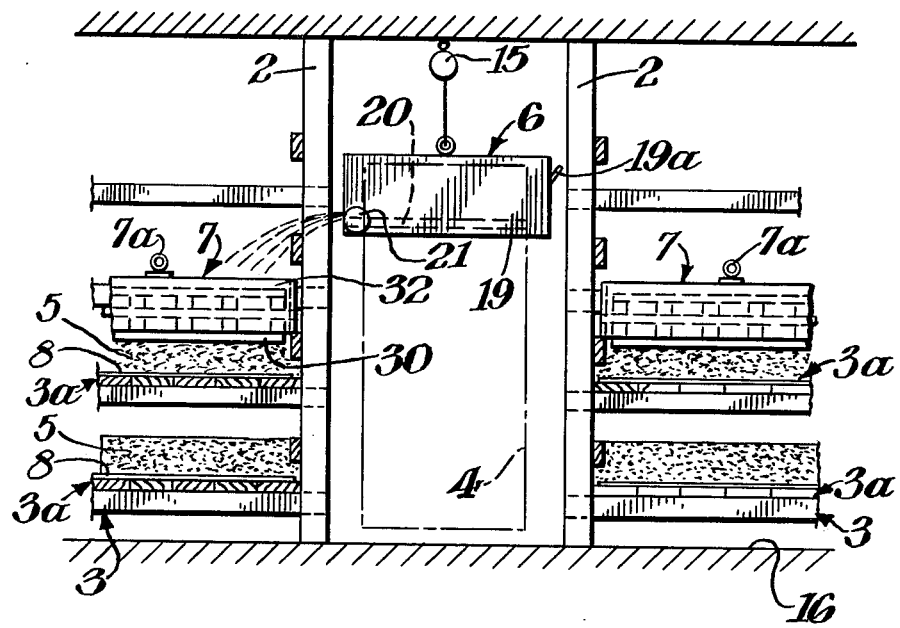
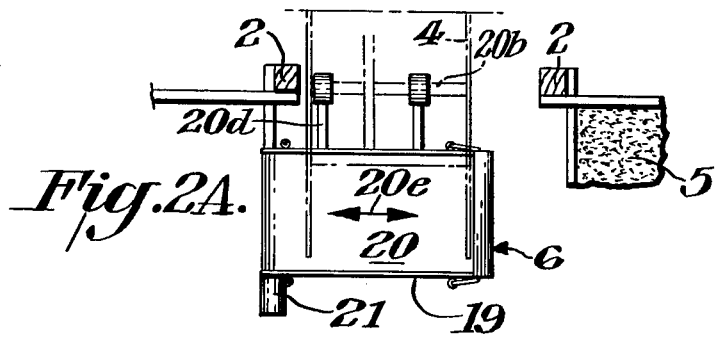
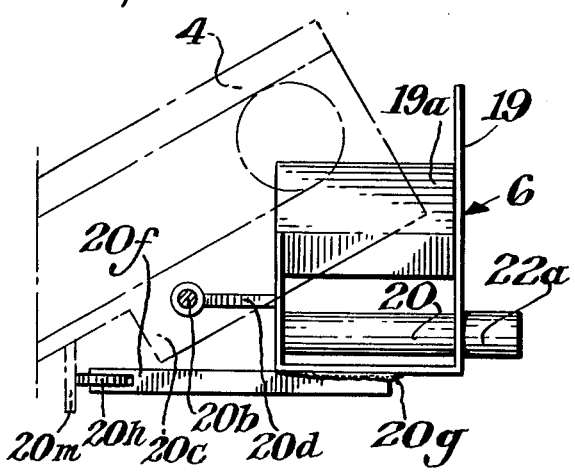
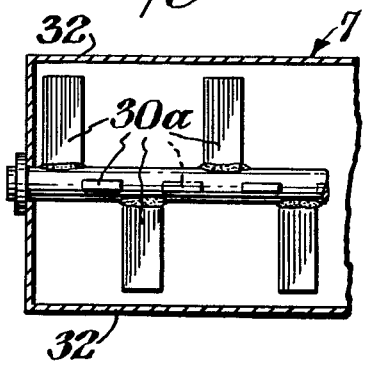

APPARATUS AND METHOD FOR LAYING COMPOST IN A MUSHROOM BED

BACKGROUND OF THE INVENTION

Presently there are two methods of growing mushrooms commercially, the shelf and the tray methods. In the tray method, mushrooms are grown in wooden trays which range in size from about 4 ft. ×4 ft. to about 4 ft.×8 ft. The major advantage of the tray method over the shelf method has been the ability to mechanize all of the mushroom growing operations. This ability lowers the use of manual labor in moving material. Drawbacks of tray systems include damage to the trays and high initial and replacement costs. In moving the heavy trays from one machine to the next and from room to room, considerable wear and tear on the trays is experienced due to the weight of the compost in the trays. The tray handling machinery is costly and requires qualified electricians and fitters to maintain the machinery. Damage to wooden trays, costly machinery and the need for full-time electricians and fitters result in very high operating costs using the tray method.

Until recently, in the shelf method, all of the mushroom growing operations, including filling, spawning, casing, picking and emptying of the shelves, were accomplished manually. This has mainly been due to the size and shape of the existing buildings. Mushroom growers have continued to use these old, manual methods in their existing buildings rather than face the expense of building entirely new houses and attempting to mechanize the various operations. In a typical mushroom house utilizing the shelf method, mushrooms are grown in shelves which are about 65 inches (165 cm) wide and about 60 ft. (18.3 m) long. These shelves are usually stacked in the mushroom house in tiers, six or so in a tier, and in adjacent tiers. The tiers are about 12 ft. (3.66 m) high. The vertical distance between shelves is about 24 inches (61 cm). The dimensions of mushroom buildings, however, often vary from plant to plant. Several of the above-mentioned tiers may be placed in a growing room. The aisles between adjacent tiers are generally no more than 32 inches (0.81 m) wide. The distance from the top of the top shelf to the ceiling of the mushroom house is usually limited to about 3 ft. (0.915 m). At the ends of each tier, only about 3 ft. (0.915 m) of space is left between the tiers and the respective walls of the building. Further complicating the problems in present mushroom houses, from a material handling standpoint, is the fact that the access into these growing rooms usually is a door which is about 32 inches (0.81 m) wide and only 6 ft. (1.83 m) high. The above description makes it clear that room for machinery and attendant personnel is very limited and, for this reason, mushroom growing operations have previously been limited to time consuming, arduous manual labor. Further, the compact arrangements just described are typical, and desirable in other respects, since much of the success of a commercial growing operation depends upon proper use of heat, air and other environmental factors which are relatively easy to control in present houses. Since there are a large number of commercial shelf systems in use, the need for mechanization has been and is great.

In the cultivation of mushrooms using the shelf method, a growing medium, compost, is first placed in the above-mentioned shelves to a depth of about 12 inches (30.5 cm). After all of the shelves in a growing room are filled with the compost, the room is sealed, and the compost is allowed to heat up, thereby completing pasteurization. After pasteurization, the compost is spawned (planted with the mushroom seed). Approximately 14 days after spawning, the compost is covered with a layer of soil, or casing, to induce fruiting of the mushrooms. When the mushrooms are grown, they are harvested by hand, and the mushroom beds are removed, again generally by hand, and the cycle is begun again, i.e. filling, spawning, casing, etc.

In the past, as previously mentioned, filling of the shelves with compost was usually accomplished manually. An attempt at mechanization of this operation is described in U.S. Pat. No. 3,936,975 (deWinter). Therein, a bed for growing mushrooms is disclosed wherein the compost is deposited at one end of the shelf onto two webs, an upper and a lower web, the lower web being of considerably more open weave than the fabric of the upper web. The upper web, upon which the compost is being directly deposited, is moved lengthwise of the shelf, sliding on the lower web which is stationary. When the growing cycle is completed, the growing medium can be removed at the end of the shelf by again sliding the upper web toward the removal end and off the shelf.

A method of mechanizing the composting and the above-mentioned casing step is disclosed in my pending patent application, Ser. No. 879,903. Therein, a reversible belt and auger are utilized to distribute a uniformly thick layer of casing on the top of the layer of compost at the proper time, or such apparatus may be utilized to distribute the compost. The invention disclosed therein does not utilize the key elements of the instant invention, i.e. the belt moving along the bottom of the shelf and acting cooperatively with the reversible, variable speed cross conveyer and the bladed leveling member of the present invention.

The present invention provides an improved, automated method and apparatus for laying compost in a mushroom shelf which, at relatively low cost, considerably reduces the manual labor required in the past and provides a very uniform depth of compost along the entire shelf length.

SUMMARY OF THE INVENTION

Apparatus is provided for depositing a uniformly thick layer of particulate material such as compost along the entire length and width of a shelf such as a mushroom growing shelf in a mushroom growing house, which apparatus comprises:

(a) a supply elevator conveyer which supplies compost through the door of and into the mushroom house to a location near one end thereof, the supply end, of the shelf; and (b) a transverse, variable speed, reversible belt conveyer capable of being driven at variable speeds and in reversible directions, the transverse conveyer being located above and adjacent the shelf in close proximity to the supply end thereof, and being capable of receiving compost from the supply elevator and distributing compost into and across the shelf at the supply end thereof onto (c) a moving web, which web, generally a flat member, moves along the bottom of the shelf in a direction from the supply end thereof toward the far end thereof, and which web receives the compost distributed onto it by the transverse conveyer at the supply end of the shelf and carries the compost toward the far end of the shelf; and (d) a fixed, rotating, bladed leveling member located above the shelf in close proximity to the supply end thereof, the blades of which extend over the entire width of the bed being formed, the bladed member being positioned above the shelf such that the rotating blades pass over the compost at a desired height from the floor of the shelf, contacting only compost that appears beyond said height. The compost is thus leveled to a desired and uniform thickness as it passes under the leveler. Thus, as compost is being supplied, the supply conveyer, transverse conveyer, moving web and bladed leveling member all act cooperatively to fill the mushroom bed with compost to a uniform bed depth along the entire length and width of the bed. The rotating elements of the leveling device throw the undesired compost upwardly and back toward the place where the compost is being fed. The operator of the transverse conveyer can readily adjust the amount of compost being fed so that the amount of compost being added plus any thrown back by the leveling device is kept at an optimum.

The moving web is preferably pulled from a spool located at the supply end of the shelf by means of a puller belt or the like connected to the moving web, the puller belt being pulled along the bottom of the shelf by means of a motor driven take-up spool located at the far end of the shelf, around which the puller belt is wrapped and taken up.

The blades of the bladed member are preferably of an open type construction having an outer member extending parallel to the axle of the bladed member and struts perpendicular to the outer member and connecting the outer member to the axle, thereby providing open spaces between said struts.

Also, the bladed member is preferably shrouded by a cover extending across the width of the leveler. The shroud emcompasses the majority of the circumferential distance swept by the revolving blades. It is usually a metal cover that terminates both at the front and the back of the leveler a short distance above the bottom-most sweep of the leveler blades. In this way, excess compost is thrown upstream of the leveler and any compost, if any, that passes into the leveler drops but harmlessly downstream of the leveler. In this way, the shroud prevents any substantial carryover of compost by the blades to a position in downstream of the blade, which carryover could result in an uneven and undesired distribution of compost on the shelf.

The method of this invention is, thereby, one for continuously and simultaneously forming a layer of particulate material which layer is of substantially uniform depth and density which method comprises feeding the material to a cross-conveyer capable of throwing the material from it substantially at a right angle to the flow of the material to it; and varying the movement of the cross-conveyer to regulate the amount of the material being thrown and to regulate the distance the material is being thrown; and receiving the thrown material on a moving flat member and continuously moving the flat member at a rate commensurate with the flow of material being thrown upon it whereby to produce a relatively uniform layer of the material on the moving flat member; and passing the moving flat member with the layer of the material thereon under a leveler capable of removing from the layer any material present in excess of that desired, thereby producing a layer of the material which is substantially uniform in depth and density along the width and length of the moving flat member.

The apparatus and method disclosed herein may be employed to distribute particulate matter in general in a uniform layer upon a shelf.

BRIEF DESCRIPTION OF THE DRAWINGS

Apparatus for distributing compost uniformly in the shelves of a mushroom growing house according to this invention is shown in the drawings, wherein:

FIG. 1 is a cutaway view of a mushroom growing house in which is shown a conveyer which supplies compost through the door of the house to a transverse, variable speed cross-conveyer which distributes the compost onto a moving belt on the floor of one shelf. This cross-conveyer is located near one end, the supply end, of the shelf being fed. The moving belt unwinds from a spool at the supply end of the shelf and moves toward the far end thereof. It is caused to unwind by a driven take-up spool at the far end of the shelf. The compost distributed at the supply end of the shelf moves on the belt under a rotating, bladed leveling device located above the bed in close proximity to the point of supply, which device levels the compost across the entire width of the bed. Through the combined simultaneous interaction of the supply conveyer, the variable speed, reversible cross-conveyer, the leveling device and the moving belt, a uniform bed depth of compost is provided over the entire width and length of the bed. While the results can be accomplished by hand, this invention affords considerable economy and controlled results. Further, by this invention one can carry out the several operations simultaneously with a considerably reduced staff.

FIG. 2, taken on line 2—2 of FIG. 1, shows an end view of the variable speed, reversible cross-conveyer, distributing compost at the supply end into one bed located in one of two tiers or shelves. FIG. 2 also shows the bladed leveling device leveling the compost.

FIG. 2A is a plan view of the cross-conveyer showing a mounting means affording a lateral movement of the cross-conveyer to the conveyer on which it is mounted.

FIG. 3 is an elevational view of the variable speed, reversible cross-conveyer.

FIG. 4 is a front view, in partial cutaway, of the leveling device (bladed) and its shroud and motor drive.

FIG. 5 is a top sectional view of the moving belt with compost thereon and the pulling belt, which pulls the moving belt over the floor of the shelf.

FIG. 6 is a side view of the moving belt and pulling belt, showing the compost located on the moving belt.

FIG. 7 is a side view of the cross-conveyer showing its mounted position on the conveyer which is shown in phantom.

FIG. 8 is a plan view of a toothed leveler, the shroud being removed.

DETAILED DESCRIPTION OF THE INVENTION AND PREFERRED EMBODIMENTS WITH REFERENCE TO THE DRAWINGS

This invention can be be described by detailed reference to the drawings.

FIG. 1 shows a conventional mushroom growing house 1, which is typically of concrete block construction, and contains a door at one end thereof. The mushroom house contains tiers of shelves for growing mushrooms. The vertical members of these tiers are shown as 2 and the horizontal shelves as 3 in FIG. 1.

A conventional conveyer 4 is shown feeding compost 5 from a supply through the door of the mushroom house to the variable speed cross conveyer 6, which then distributes the compost into and onto the floor of the shelf 3, as shown. FIG. 1 shows compost being distributed onto the second shelf from the top of the tier. The principles of operation are identical for all other levels.

Each shelf in a tier has, of course, a floor, such as is provided by planks $3a$ (FIG. 2) or a some such supporting movable member. The longitudinal side walls $3b$ (FIG. 1) are, of course, stationary. In order to allow the compost to reach the web on a floor of the shelf being processed, the flooring or support $3a$ of the shelf immediately above is pushed toward the exit end (downstream) of the tier assembly as, for example, is shown in FIG. 1, or they are otherwise removed from the space through which the compost is to fall, as for example, by placing the subject planks partially on top of other flooring downstream on the same shelf. If desired, conveyer 4 could be kept in one, high position, and with all flooring so pushed or placed at each level but the bottom-most. Compost could be fed to the bottom-most and then one could successively treat each successively higher shelf. In such a manner, a hopper of some height is created and used. It is preferred, however, to keep the hopper smaller. Thus, whenever possible, conveyer 4 is raised and lowered through the use of pivotable member $4a$ and wheels $4b$ so that transverse conveyer 6 can be positioned only slightly higher than the shelf being processed. In such action only the flooring in the tier immediately above the shelf being processed need be displaced downstream to create the hopper. Thus, the compost thrown by cross-conveyer 6 is caught or trapped sooner than otherwise would be the case if the hopper were taller, as it falls very quickly on the web. This cuts down waste and keeps the premises cleaner.

On the floor of shelf 3 is moving belt or web 8 onto which the compost is distributed at the supply end of the shelf. Belt or web 8 is being unwound from supply roll $9a$ located at the supply end of the shelf. Web 8 may be pulled from supply roll $9a$ by pulling belt 11 and motor drive and take-up roll 10. Prior to distributing compost on the shelf, the pulling belt 11 is unrolled from take-up roll 10 at the far end of the shelf and laid out along the floor of shelf 3 to the supply end. There, pulling belt 11 is clamped to clamp 12 (FIG. 6) and web 8 is also attached to clamp 12. It is to be appreciated that clamp 12 may be replaced by equivalent pulling means as may be belt 11, as, for example, by a belt gripping means pulled by a cable(s). Such a gripping means may be a vice or pair of jaws that grip the belt along its entire width. The clamp device 12, whatever its form, generally extends the width of the bed that is being made being comparable to the width of web 8 so that the pulling is exerted uniformly on web 8 across its width.

When compost is to be distributed, the motor drives for the compost elevator conveyer, the cross distributor, the leveling device (to be described below) and the pulling belt are all activated, thereby cooperatively effecting laydown and uniform distribution of compost in the shelf. The operator has all the controls within easy reach and can readily vary the speeds of the moving elements and the amounts of the material being moved.

Rotating, bladed leveling device 7 is shown in FIG. 1 leveling the compost as the bed passes thereunder on moving belt 8, thereby assisting in producing a uniform height or thickness of compost 5 in the bed.

For completeness, FIG. 1 also shows power driven winches 13, 14 and 15 used to support spools and frames 9 and 10 and the cross-conveyer 6, respectively. Outside ground level is indicated as 16. Generally, winch 13 is dispensed with, because supply roll of web 8 can be easily supported in a lightweight support 9 which in turn is supported at its both ends by the uprights 2. No motor is needed in element 9. Web 8 simply freely unwinds as take-up roll 10 demands. Thus, the support or frame 9 can simply be manually lifted up to the next shelf and supported there also by proper supports as bracket $9a$ (FIG. 1). It is also to be appreciated that winch 15 (FIGS. 1 and 2) may be dispensed with by mounting cross-conveyer 6 on conveyer 4. Element 6 may be supported separately from conveyer 4 if desired, and winch 15 can be used in the raising and lowering of it. Preferably, it is mounted on the exit end of conveyer 4. So mounted it will be raised or lowered as conveyer 4 is moved backwards or forwards with attendant raising or lowering of its exit end. As to winch 14, it is generally used, because the take-up element 10 includes rather heavy elements such as a motor (not shown for convenience).

The variable speed, reversing cross-conveyer 6, located in the aisle between tiers of mushroom beds, is an important key to this invention. An operator positioned in close proximity to the supply end of the shelf controls the speed and direction of this cross-conveyer to assure that the compost being fed to the supply end of the shelf is distributed thereat in a reasonably uniform manner. The variable speed, reversible cross-conveyer is described in more detail as follows.

As shown in FIG. 3, the cross-conveyer 6 comprises an endless belt 20 which is conventionally supported in the conventional manner on rotatable members such as roller 21, the rollers being mounted in a housing $20a$ as at $21a$ and $21b$. At least one roller is capable of being reversibly driven as shown by double arrow 22. The driving means may be a conventional variable speed motor (not shown for convenience) capable of reversing the belt's direction or a hydraulic pump driving unit with the same capabilities. The housing $20a$ generally is equipped with splash board 19 opposite the compost entrance end to prevent compost from being thrown past conveyor 6 and toward the operator who is usually positioned just beyond splash board 19. The speed control elements for controlling the rate of movement of elements 4, 6, 7 and 10 are immediately handy to the operator. Since they are conventional elements, they have not been shown for convenience.

The side of $20a$ from which compost is to be ejected is, of course, open and the inoperative side is blocked by removable splash board $19a$. When reversal is desired the operator merely positions $19a$ on the opposite side.

While conveyer 6 may be positioned as shown in FIG. 2, it is desirable to avoid spillage of compost onto the floor directly below the acting exit end of conveyer 6. This can be accomplished by use of a splash board underneath element 6 or by swinging the conveyer 6 into the position shown in plan view FIG. 2A. In the embodiment in which conveyer 6 is mounted on conveyer 4, a rod $20b$ is supported in a fixed position in close proximity to the exit end of conveyer 4. Rod $20b$ is mounted on and supported by the two extensions $20c$ that are fixed to the frame of elevator 4 and extends downwardly at the exit end of the conveyer (FIG. 7). Slidably mounted on rod 20b by means of support members 20d is housing 20a, the slidable mounting being through rings 20dd on 20d, for example. This permits housing 20a to be moved laterally (arrow 20e) in respect to conveyer 4 so that positioning of cross-conveyer 6 shown in FIG. 2A is readily made in either tier to the right or left of conveyer 4 without moving conveyer 4. Pivoting of cross-conveyer 6 is controlled by support 20f (FIG. 7) which is adjustable upwardly and downwardly at 20g. At the other end of support 20f is roller 20h that bears against and rolls or moves horizontally on bracket 20m which in turn is mounted on the frame of elevator 4 (FIG. 7).

As can be seen in FIG. 2A alone or by comparing the position of cross-conveyer 6 in this view with that in FIG. 2, the cross-conveyer 6 has been moved slightly past support 2 so that the particulate material 5 must fall into the shelf or the bed being made. Any gap between cross-conveyer 6 and the subject tier or shelf has been eliminated. The arrow 20e and the fragment of the adjacent tier shown in FIG. 2A suggests the similar positioning of cross-conveyer 6 as to the adjacent tier. It is also to be understood that conveyer 4 can enter the aisle slightly at an angle to the right or left, if desired, to assist in the desired elimination of said gap.

When one shelf in one tier has been filled with compost as described above, the direction of the cross-conveyer 6 may be reversed and the compost may be distributed to the corresponding shelf located in the next adjacent same-level tier as shown in FIG. 2. There is shown the supply conveyer 4 (in phantom) feeding compost to the cross-conveyer 6, wherein conveyer belt 20 is used to distribute the compost into the left bed as shown. This cross-conveyer is powered by variable speed, reversible motor 22a. Also shown in FIG. 2, in end view, are previously described bladed leveling device 7, moving web 8, shelf floor 3, and the level bed of compost 5 being laid down on the second shelf from the top of the tier. Under the second shelf is shown the third shelf from the top onto which a uniformly thick layer of compost 5 has previously been laid onto web 8.

When the bed shown on the left tier of FIG. 2 has been completed, then the direction of the cross-conveyer 6 may be reversed, and the entire process repeated to fill the second shelf from the top on the right tier of FIG. 2 without much movement of the cross-conveyer, thus adding greatly to the efficiency of this system.

Bladed device 7 is shown in FIG. 2, wherein the device is seen to comprise rotating blades 30 contained inside shroud 32. Motor drive 34, shown in FIG. 4, has been omitted from FIG. 2 for clarity of presentation.

FIG. 4 shows in partial section the bladed leveling device 7 of this invention. This device comprises rotating blade members 30, preferably steel, mounted upon an axle 33 as shown and driven by motor 34. The blade member preferably is constructed as shown, with open spaces between the blades, 30, and the struts 31, which connect the blades 30 to axle 33. Such open spaces alleviate buildup of compost behind blades 30 which eventually could cause blade stoppage, binding and causing the blade motor to burn out. From FIG. 4 it will be seen that upon rotation each blade 30 sweeps below the bottom edge 32a of housing or shroud 32. On looking at the leveler from the front or back one will see blades 30 and a portion of struts 31 since the cover or shroud does not come all the way down. It terminates about 4 to 10 inches above the bottom-most position of the bottom edge of blade 30. Leveler 32 is positioned so that the bottom edge of 30a of each blade 30 is sweeping at a point commensurate with the height of the compost bed desired. With the opening in the front or upstream of leveler 7 compost above the desired level is thrown away from and upstream of leveler 7. With the opening at the back any compost that does get inside the leveler 7 is allowed to drop on the compost underneath of and moving downstream of leveler 7. The top sections of the cover prevent compost coming from cross-conveyer 6 from falling directly into leveler 7.

In another modification (FIG. 8) blades 30 are replaced by a plurality of teeth 30a. There are, in effect, staggered struts 31 of equivalent length and sweeping capabilities as the strut 31/blade 30 elements. In still another modification, blades 30 are not supported on the axle 33 of the leveler 7 as shown in FIG. 4 but are mounted on chains, these being two chains one at each end of the leveler each chain being driven by a sprocket. The sprockets in turn being driven by motor 34. Using this blade/chain/sprocket arrangement one need not use shroud 32. In constructing the apparatus of this invention, one will, of course, design the size and weight and kind of the elements and driving powers of the motors or the like to minimize the energy costs.

Unit 7 is placed as shown in FIG. 1 and is kept there during the making of the given bed. Upon finishing it, unit 7 is removed and raised to the next shelf. Since the unit is heavy, eye 7a is fixed centrally on unit 7 so that winch 15 can be used in raising and lowering unit 7, if so desired.

Also shown in FIG. 4 is shroud 32 partially surrounding the blade member. The extent of coverage of the blade member by shroud 32 is better seen in FIG. 1. The shroud prevents carry-over of compost by the blades to a position downstream of the blades, which carry-over would result in an uneven and undesired distribution of the compost on the bed. The shroud can, of course, be a continuously curving member rather than angular as shown in FIG. 1.

FIG. 5 shows a top view of the belt assembly advancing along the mushroom bed. This advancement is indicated by the arrow. In this figure, the pulling belt 11 is clamped by clamp 12 to web 8 (not shown) upon which compost 5 has been uniformly distributed.

FIG. 6 shows a side view of one belt assembly of this invention advancing along the mushroom shelf 3, wherein pulling belt 11, clamped indirectly to moving web 8 by means of clamp 12, advances web 8 containing compost 5 uniformly distributed thereon along the bottom of the shelf.

Clamp 12 is preferably of steel and is preferably designed and bolted as shown to prevent slippage or disengagement of the web 8 (and belt 11) out of the clamp.

Using the apparatus and method of this invention, laying of particulate material such as compost in a uniformly thick layer into a shelf, such as those used in mushroom houses, can be effected with a minimum of personnel. The equipment is easily installed and moved about even in the confined spaces of conventional mushroom houses. No loss of tillable square footage is incurred, and no plant modification is required. Most importantly, a uniform layer of compost or of other particulate material, such as dirt, sand, gravel, pulverized corn cobs, for example, is formed. The width of the moving web 8 and blades 30 conform closely to the width of the shelf so that uniform bed thickness even at the edges of the bed is readily achieved.

Once a single shelf is filled with compost, moving web 8, which extends the entire length of the shelf, is stopped, and pulling belt 11 and the conveyers and the leveling member are moved to make another bed. Web 8 at a finished area is left in place during one growing cycle, after which it may be pulled by wind-up 10, thereby discharging the compost thereon at the far end of the bed into containers for removal from the mushroom house.

The equipment of this invention thus permits one to prepare multiple beds in tiers with considerably more ease and in less time than was heretofore possible. The elements of this invention combine to afford facility and desirable economics in the difficult art of mushroom growing.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. Apparatus for depositing a uniformly thick and uniformly dense layer of compost along the entire length and width of a shelf in a mushroom growing house, which apparatus comprises:
   (a) a supply elevator conveyer which supplies compost into said mushroom house to a location near one end thereof, the supply end of said shelf; and
   (b) a transverse, variable speed, reversible belt conveyer capable of being driven at variable speeds and in reversible directions, said transverse conveyer being located above and adjacent said shelf in close proximity to said supply end thereof, and being capable of receiving compost from said supply elevator and distributing compost into and across said shelf at the supply end thereof onto
   (c) a moving web, which web moves along the bottom of said shelf in a direction from the supply end thereof toward the far end thereof, and which web receives said compost distributed onto it by said transverse conveyer at the supply end of the shelf and carries the compost toward the far end of the shelf; and
   (d) a fixed, rotating leveling member having rotatable elements located above said shelf in close proximity to the supply end thereof, said elements extending over the entire width of the bed, being prepared and being positioned above the shelf such that on rotation said elements pass over the compost at a desired height from the floor of the shelf contacting only compost beyond said height and throwing it upwardly and back into the area initially receiving material, thereby preventing any substantial carryover of compost downstream and thereby leveling the compost to a desired and uniform thickness as the compost passes under said leveling member, whereby, as compost is being supplied, the supply conveyer, the transverse conveyer, the moving web and the leveling member all act cooperatively to form a mushroom bed having compost out a uniform depth along the entire length and width of said bed, said rotatable elements comprising blades of an open type construction comprising an outer member extending parallel to the axle rotating said elements and struts perpendicular to said outer member and connecting said outer member to said axle, thereby providing open spaces between said struts.

2. Apparatus in accordance with claim 1 in which said reversible belt conveyor is slidably mounted on said elevator conveyor, thereby allowing lateral movement of said belt conveyor relative to said elevator.

3. Apparatus in accordance with claim 1 in which said rotatable elements comprise a plurality of teeth in staggered relationship and spanning the width of said movable web.

4. Apparatus of claim 1 in which said bladed members are contained beneath a cover that terminates at its front and at its back about 4 to about 10 inches above the bottom-most position of bottom edge of said blades.

* * * * *